United States Patent [19]

Callas et al.

[11] Patent Number: 4,940,159

[45] Date of Patent: Jul. 10, 1990

[54] COMPARTMENTED REFUSE CONTAINER

[76] Inventors: Anise M. Callas, 1915 N. 31st Rd., Hollywood, Fla. 33021; Steven S. Casper, 561 Bayshore Dr., Fort Lauderdale, Fla. 33304

[21] Appl. No.: 382,398

[22] Filed: Jul. 20, 1989

Related U.S. Application Data

[63] Continuation-in-part of Ser. No. 361,432, Jun. 5, 1989, abandoned.

[51] Int. Cl.$^5$ .............................................. B65D 25/16
[52] U.S. Cl. ..................................... 220/404; 220/1 T; 220/22
[58] Field of Search .................. 220/1 T, 22, 400–407

[56] References Cited

U.S. PATENT DOCUMENTS

| 3,807,598 | 4/1974 | Nutt | 220/1 T |
| 3,977,450 | 8/1976 | Schampier | 220/404 |
| 4,331,252 | 5/1982 | Carren et al. | 220/404 |
| 4,834,262 | 5/1989 | Reed | 220/1 T |

Primary Examiner—Joseph Man-Fu Moy
Attorney, Agent, or Firm—Alvin S. Blum

[57] ABSTRACT

A receptacle for solid wastes has a separate chamber for each different category of waste such as paper, glass, food. The chambers are joined together at common walls for compact and economical structure. Structure including bag-engaging notches in the upstanding rims of each chamber provided for holding a disposable lining bag in each chamber. Separate top opening covers seal each chamber and provide access for removal of the contents together with the lining bag for enhanced sanitation and convenience. A right-angle configuration fits into a corner.

7 Claims, 4 Drawing Sheets

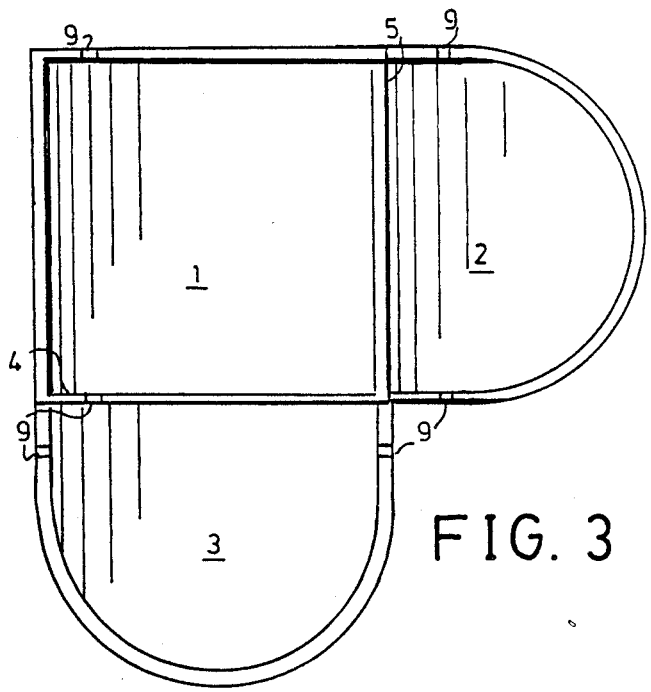
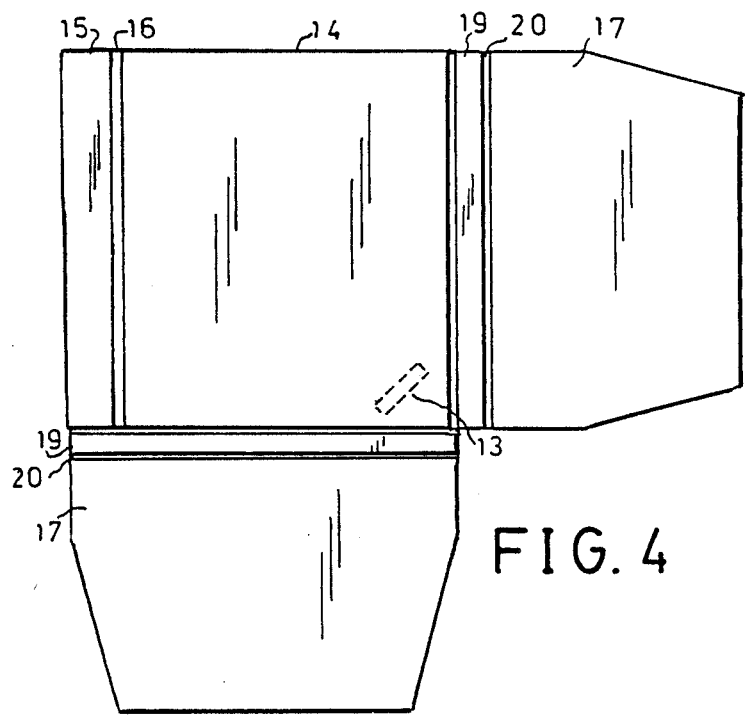

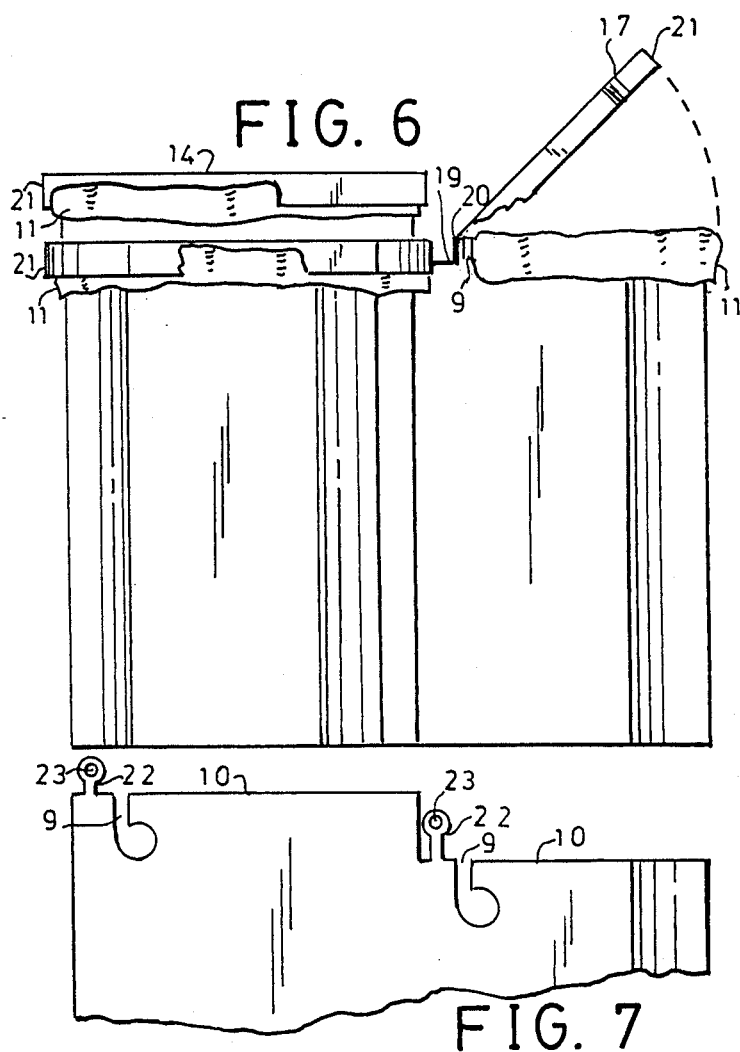

COMPARTMENTED REFUSE CONTAINER

This application is a continuation in part of application serial number 07/361,432 filed 6/5/89, now abandoned.

This invention relates to refuse containers and more particularly to a refuse container with a plurality of coverable chambers each one of which holds an opened, disposable plastic film bag so that refuse may be segregated at the point of accumulation for eventual recycling.

BACKGROUND OF THE INVENTION

Efforts are being made to segregate solid wastes into separate categories so that certain wastes may be recycled, such as paper, plastic, aluminum, etc. Municipalities provide open boxes for each category to be left outside at collection time. There are no provisions made to provide an integrated refuse container that will enable the householder to maintain separate collection chambers in the kitchen that can be kept clean and covered in a minimum of space. It is awkward to maintain multiple covered containers for each category. Furthermore, most containers would require washing out after use to maintain sanitary containers in the kitchen.

SUMMARY OF THE INVENTION

It is accordingly an object of the invention to provide a single, integrated refuse container that is compact and space conserving, that provides separate compartments for different types of solid wastes, and that provides for individual disposable plastic bag liners and separate covers so that the one only has to open the compartment selected. The refuse container of the invention includes at least three chambers with individual top openings each arranged to hold open, and in place, a plastic film bag within the chamber so that the waste may be directly deposited into the bag, avoid soiling of the chamber itself and permitting sanitary emptying of each compartment by lifting out the bag with its contents for disposal. Each chamber is fitted with a separately operated cover that covers the chamber top opening and the top opening in the plastic bag to control odor and vermin.

These and other objects, features and advantages of the invention will become more apparent when considered in conjunction with the detailed description and the drawings.

BRIEF DESCRIPTION OF THE DRAWINGS

FIG. 3 is plan view of an alternative embodiment of the invention without its covers.

FIG. 4 is a plan view as in FIG. 1 with covers in place.

FIG. 5 is a detail of a front elevation showing a cover connector and bag engaging notch.

FIG. 6 is a front elevation view of the container with portions of the covers broken away to show bag liners.

FIG. 7 is a detail of a front elevation showing an alternative cover hinge connection.

DETAILED DESCRIPTION OF PREFERRED EMBODIMENTS

Figure 1:
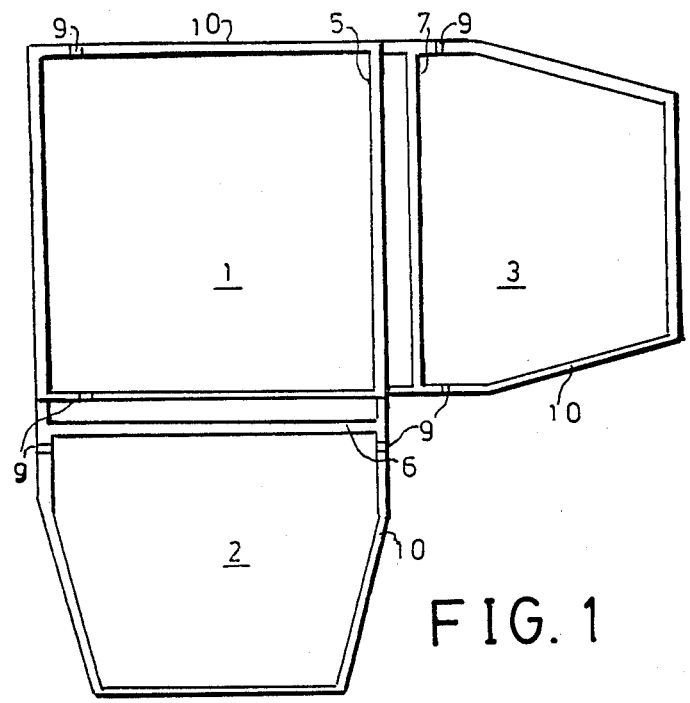
FIG. 1 is a plan view of the container without its covers.
Figure 2:
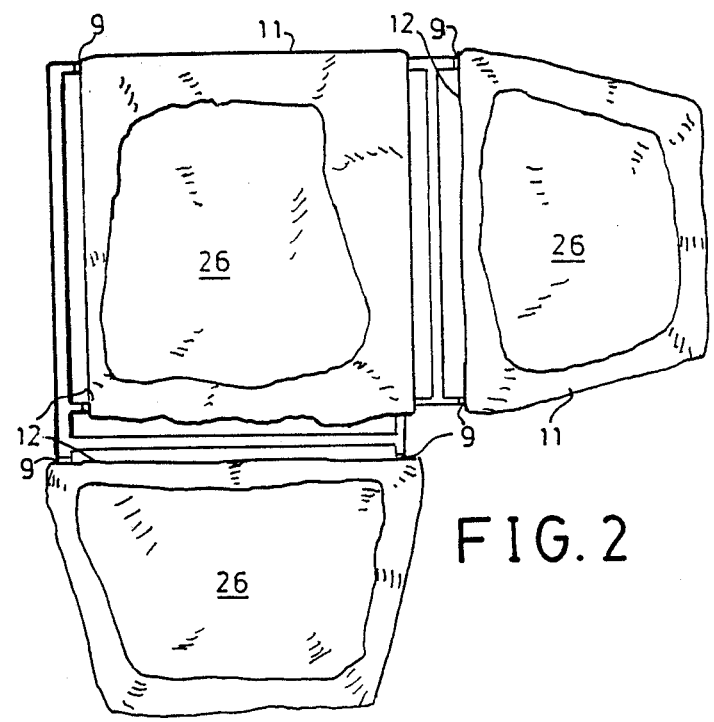
FIG. 2 is a plan view as in FIG. 1 with plastic bags in place in each compartment.
Figure 8:
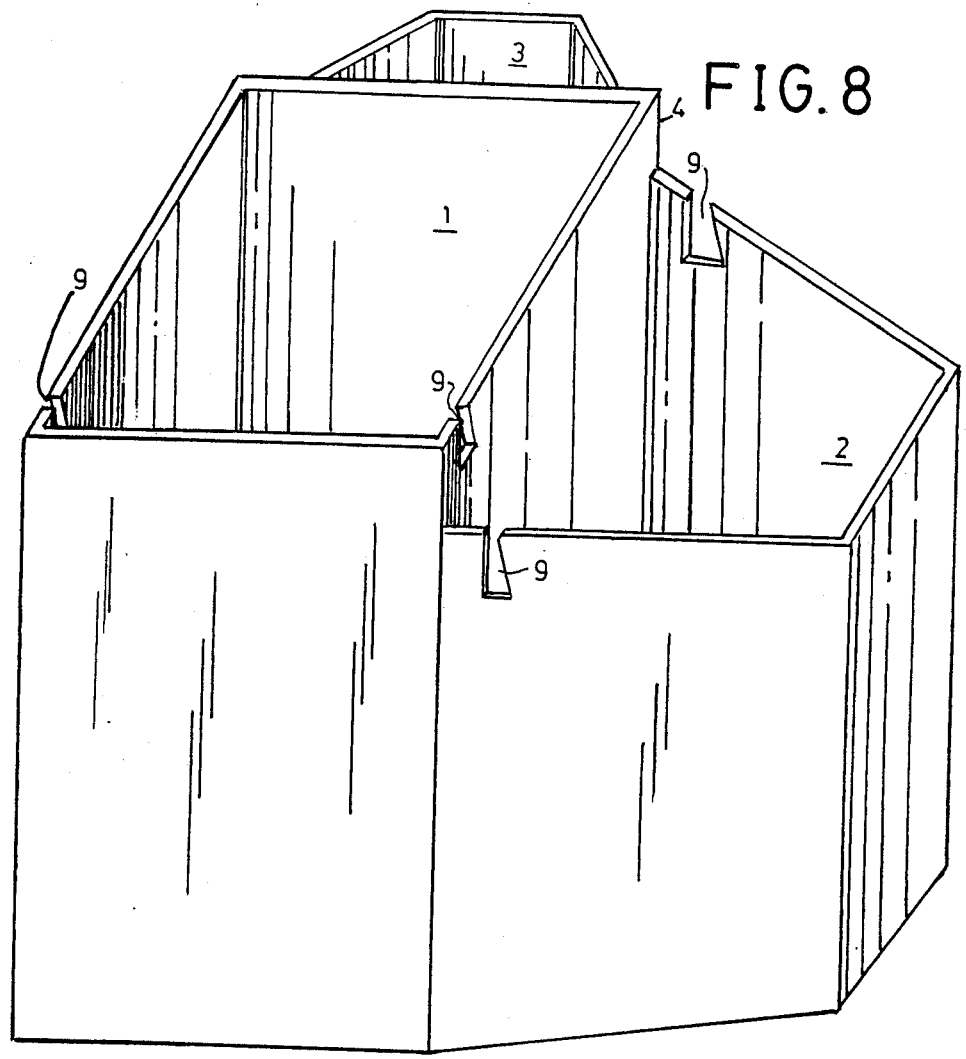
FIG. 8 is a perspective view of a container of the invention with covers removed.

Referring now first to FIGS. 1 and 8 showing the preferred arrangement of three adjoining chambers 1,2,3 arranged in a corner configuration with a central chamber 1 and adjacent chambers 2 and 3, each sharing a common side 4 or 5 with the central chamber 1 for an economical, rigid and compact structure that fits conveniently into a corner. FIGS. 1 and 8 show the chamber structure without top cover structures. The common sides 4 and 5 may be constructed with pairs of parallel walls as shown for convenience in supporting cover structure, or may be formed with single walls by eliminating walls 6 and 7, for example, as in FIG. 3. Bag engaging notches 9 extend downward from the top edge 10 of each chamber. Disposable plastic film, or paper, bags 26 are inserted into each chamber and the upper edges 11 of the bags are rolled over the upstanding rims or upper edges 10 of the chambers until they meet the pair of opposed notches 9, at which point the upper edge 12 of the bag 26 is positioned within the chamber as shown in FIGS. 2 and 6. The fixed portion of the cover is attached to the upstanding rim of one side of the chamber and the top of the bag is stretched across that side within the chamber and between the notches.

This arrangement with notches for the bag along the hinged side permits the structure of hinged covers shown in FIGS. 4 and 6 whereby each compartment is provided with a separately operated, hinged cover that securely covers the top opening in the chamber and the bag with a cover having an overhanging downward extending edge to effectively seal the lined chamber from odor and vermin for use within the home.

As shown, the upper edge of the central chamber 1 is above the tops of the adjacent chambers 2,3. This is for ease of grasping the central cover 14. The tops may be arranged in a common plane with a handle 13, shown in phantom in FIG. 4, provided for operating cover 14. The moving portion 14 of the cover is attached by hinge 16 to a fixed portion 15 fixedly attached to the chamber 1. Each of the adjoining chambers likewise has a movable cover 17 attached by hinge 20 to a fixed portion 19. The fixed, movable and hinge portions of each cover may be molded in one piece of a suitable plastic such as a polyolefin as is well known in the art. Each cover has a downward directed outer edge 21 shown partially broken away in FIG. 6 to reveal how it covers the edge 11 of the bag rolled over the upstanding rim of the chamber.

FIG. 7 shows an alternative cover hinge arrangement in which the upper edge 10 of each chamber has an upward projection 22 with an aperture 23 to receive a hinge pin for a cover hinge (not shown) in hinge structure well known in the art.

FIG. 5 shows an alternative hinge support 24 fastened to common wall 4.

The shapes of the chambers may be varied for aesthetic or economic reasons, with FIG. 3 illustrating how adjacent chambers may have curvilinear walls for enhanced structural rigidity with minimal wall thickness.

Figure 9:
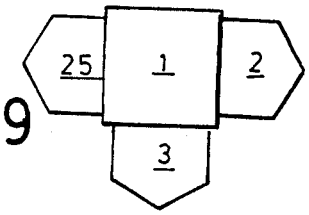
FIG. 9 is a diagrammatic plan view of an alternative embodiment of the invention with four chambers.

FIG. 9 shows an arrangement with three adjacent chambers 2,3, and 25 adjoining a common center chamber 1. An alternative embodiment for three chambers for use against a straight wall may be configured by elimination of chamber 3.

As shown in FIGS. 5 and 8 the bag-engaging notches 9 may have various shapes to enhance the holding of the bag in place in the chamber.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

We claim:

1. A compartmented waste receptacle for segregating different types of solid wastes in separate covered and lined chambers, said receptacle comprising:
    (a) a central chamber having vertical sides and an open top with an upstanding rim;
    (b) a first adjoining chamber sharing one common vertical side with said central chamber and having an open top with an upstanding rim;
    (c) a second adjoining chamber sharing one common vertical side with said central chamber and having an open top with an upstanding rim;
    (d) a pair of opposed vertical bag-engaging notches extending downward from said upstanding rim of each of said chambers, said pair of notches arranged in combination with said rim to hold a bag liner folded over a portion of said rim and extending suspended between said notches;
    (e) a separate cover arranged to cover each said chamber, each said cover having a downward directed edge flange extending over said rim and said bag liner, said cover having a top-opening movable portion hingedly connected to a fixed portion by hinge means, said hinge means arranged along a vertical side adjacent said pair of notches.

2. The receptacle according to claim 1, in which said first chamber and said second chamber share adjacent vertical sides with said central chamber to thereby provide a right angle configuration to fit into a corner.

3. The receptacle according to claim 1, in which said first chamber and said second chamber share opposite vertical walls with said central chamber to thereby provide a straight configuration.

4. The receptacle according to claim 1 further comprising a third chamber sharing one common vertical side with central chamber and having an open top with an upstanding rim for containing waste in four separate compartments.

5. The receptacle according to claim 1, in which each said cover is molded of resilient plastic in one piece including said edge flange, said movable portion, said fixed portion and said hinge means.

6. The receptacle according to claim 1, in which each said common vertical side includes a pair of parallel walls.

7. The receptacle according to claim 1, in which said hinge means includes paired vertical projections extending upward from said rim, said projections having hinge-pin apertures therein for supporting a hinge pin for said cover.

* * * * *